(12) United States Patent
Knize et al.

(10) Patent No.: US 8,558,847 B2
(45) Date of Patent: Oct. 15, 2013

(54) DISPLAYING SITUATIONAL INFORMATION BASED ON GEOSPATIAL DATA

(75) Inventors: Nicholas W. Knize, Rockwall, TX (US); Larry L. Johnson, Sachse, TX (US); Roberto Reta, Richardson, TX (US)

(73) Assignee: Raytheon Company, Waltham, MA (US)

( * ) Notice: Subject to any disclaimer, the term of this patent is extended or adjusted under 35 U.S.C. 154(b) by 580 days.

(21) Appl. No.: 12/501,766

(22) Filed: Jul. 13, 2009

(65) Prior Publication Data
US 2011/0010674 A1    Jan. 13, 2011

(51) Int. Cl.
*G09G 5/00*  (2006.01)

(52) U.S. Cl.
USPC ............................ 345/629; 345/633; 345/619

(58) Field of Classification Search
USPC .................................. 345/629, 619, 581, 633
See application file for complete search history.

(56) References Cited

U.S. PATENT DOCUMENTS

| | | | |
|---|---|---|---|
| 5,799,082 A | 8/1998 | Murphy et al. | |
| 5,987,136 A | 11/1999 | Schipper et al. | |
| 6,724,930 B1 | 4/2004 | Kosaka et al. | |
| 6,885,939 B2 * | 4/2005 | Schmidt et al. | 701/428 |
| 7,847,729 B2 * | 12/2010 | Tysowski et al. | 342/357.62 |
| 7,978,207 B1 * | 7/2011 | Herf et al. | 345/619 |
| 7,991,283 B2 * | 8/2011 | Chen et al. | 396/310 |
| 8,108,144 B2 * | 1/2012 | Forstall et al. | 701/426 |
| 2007/0199076 A1 | 8/2007 | Rensin et al. | |
| 2007/0242131 A1 | 10/2007 | Sanz-Pastor et al. | |
| 2008/0024484 A1 | 1/2008 | Naimark | |
| 2008/0074423 A1 | 3/2008 | Gan et al. | |
| 2009/0002394 A1 | 1/2009 | Chen et al. | |
| 2009/0024315 A1 | 1/2009 | Scheibe | |
| 2010/0046842 A1 * | 2/2010 | Conwell | 382/218 |

FOREIGN PATENT DOCUMENTS

| | | |
|---|---|---|
| EP | 1 480 187 | 11/2004 |
| EP | 1 748 370 | 1/2007 |
| JP | 2004 226190 | 8/2004 |
| JP | 2005 201513 | 7/2005 |
| WO | WO 2008/078790 | 7/2008 |

OTHER PUBLICATIONS

PCT Notification of Transmittal of the International Search Report and the Written Opinion of the International Searching Authority, or the Declaration, for International Application No. PCT/US2010/041674, 11 pages, dated Oct. 29, 2010.
Google Earth, http://earth.google.com, 2 pages.
NASA World Wind, http://worldwind.arc.nasa.gov, 3 pages, Oct. 16, 2006.

(Continued)

*Primary Examiner* — M Good Johnson
(74) *Attorney, Agent, or Firm* — Cantor Colburn LLP

(57) ABSTRACT

In accordance with a particular embodiment of the invention, a request for a geotag comprising situational information and geographic coordinates may be received from a requestor. The request may include geospatial data, such as position data and viewing angle data, that identifies a location of the requester. The position data may be latitude data, longitude data, and/or elevation data, and the viewing angle data may be azimuth data, compass direction data, and/or orientation data. The geographic coordinates of a candidate geotag may be compared to the location received in the request. If the candidate geotag is near the location received in the request, it may be sent to the requestor.

19 Claims, 2 Drawing Sheets

(56) References Cited

OTHER PUBLICATIONS

U.S. Appl. No. 12/501,905, "Extraction of Real World Positional Information from Video", inventory Larry J. Johnson et al., 18 pages (including drawings), filed Jul. 13, 2009.

U.S. Appl. No. 12/501,969, "Overlay, Information Over Video", inventor Larry J. Johnson et al., 30 pages (including drawings), filed Jul. 13, 2009.

U.S. Appl. No. 12/501,785, "Synchronizing Video Images and Three Dimensional Visualization Images", inventor Nicholas W. Knize et al., 23 pages (including drawings), filed Jul. 13, 2009.

PCT Notification of Transmittal of the International Search Report and the Written Opinion of the International Searching Authority, or the Declaration, for International Application No. PCT/US2010/041276, 15 pages, dated Sep. 27, 2010.

"Google Earth User Guide", Internet Citation Jan. 1, 2007 pp. 1-131 XP007910480 http://www.docstoc.com/docs/4625050/Google-Earth-User-Guide.

Neumann, et al., "Augmented Virtual Environments (AVE): Dynamic Fusion of Imagery and 3D models" Proceedings IEEE 2003 Virtual Reality, Los Angeles, CA., Mar. 22-26, 2003, pp. 61-67, XP0106376212 DOI; DOI: 10.1109/VR.2003.1191122 ISBN: 978-0-7695-1882-4.

Eugster, et al. "UAV-Based Augmented Monitoring—Real-Time Georgeferencing and Integration of Video Imagery with Virtual Globes", International Archives of Photogrammetry and Remote Sensing IAPRS, vol. XXXVII Jul. 3, 2008, pp. 1229-1236, XP002600483, XXIst ISPRS Congress, Jul. 3-11, 2008 Beijing, China, International Society for Photogrammetry and Remote Sensing ISSN: 1682-1750; http://www.isprs.org/proceedings/XXXVII/congrress/1_pdf/209.pdf.

PCT Notification of Transmittal of International Search Report and the Written Opinion of the International Searching Authority, or the Declaration, for International Application No. PCT/US/2010/041641, 16 pages, dated Oct. 1, 2010.

PCT Notification of Transmittal of International Search Report and the Written Opinion of the International Searching Authority, or the Declaration, for International Application No. PCT/US/2010/041269, 12 pages, dated Oct. 12, 2010.

Makita, et al., "Shared database of Annotation Information for Wearable Augments Reality System", Steroscopic Displays and Virtual Reality Systems, XI pp. 464-471, Jan. 19, 2004, XP040254217, ISSN: 0277-786X.

Hollerer, et al., "User Interface Management Techniques for Collaborative Mobile Augments Reality", Computers and Graphics, Elsevier, GB LNKD-DOI: 10.1016/S0097-8493(1)00122-4 vol. 25, No. 5, Oct. 1, 2001, pp. 799-810, XP004318025 ISSN: 0097-8493.

\* cited by examiner

DISPLAYING SITUATIONAL INFORMATION BASED ON GEOSPATIAL DATA

RELATED APPLICATIONS

This application is related to U.S. patent application Ser. No. 12/501,905, entitled "EXTRACTION OF REAL WORLD POSITIONAL INFORMATION FROM VIDEO,"; to U.S. patent application Ser. No. 12/501,969, entitled "OVERLAY INFORMATION OVER VIDEO,"; and to U.S. patent application Ser. No. 12/501,785, entitled "SYNCHRONIZING VIDEO IMAGES AND THREE DIMENSIONAL VISUALIZATION IMAGES,", all filed concurrently with the present application.

TECHNICAL FIELD

The present disclosure relates generally to image displays, and more particularly to displaying situational information based on geospatial data.

BACKGROUND

A decision-maker may have difficulty making a decision in the absence of information. For example, a decision-maker in an unfamiliar situation may lack access to situational information that may affect the decision.

SUMMARY OF EXAMPLE EMBODIMENTS

In accordance with a particular embodiment of the invention, a request for a geotag comprising situational information and geographic coordinates may be received from a requester. The request may include geospatial data, such as position data and viewing angle data, that identifies a location of the requester. The position data may be latitude data, longitude data, and/or elevation data, and the viewing angle data may be azimuth data, compass direction data, and/or orientation data. The geographic coordinates of a candidate geotag may be compared to the location received in the request. If the candidate geotag is near the location received in the request, it may be sent to the requestor.

Certain embodiments of the present invention may provide various technical advantages. A technical advantage of one embodiment may allow users of a situational awareness tool to share communications and observations. For example, a user may view a display comprising the communications and observations of other users to learn information about a situation. In some embodiments, the communications and observations may be displayed on a background image that depicts the user's surroundings. The background image may be selected according to the perspective of a device used to generate the display. For example, the background image may be selected according to the position and viewing angle of the device.

Although specific advantages have been enumerated above, various embodiments may include all, some, or none of the enumerated advantages. Additionally, other technical advantages may become readily apparent to one of ordinary skill in the art after review of the following figures and description.

BRIEF DESCRIPTION OF THE DRAWINGS

For a more complete understanding of certain embodiments of the present invention and features and advantages thereof, reference is now made to the following description taken in conjunction with the accompanying drawings, in which.

DETAILED DESCRIPTION

Figure 1:
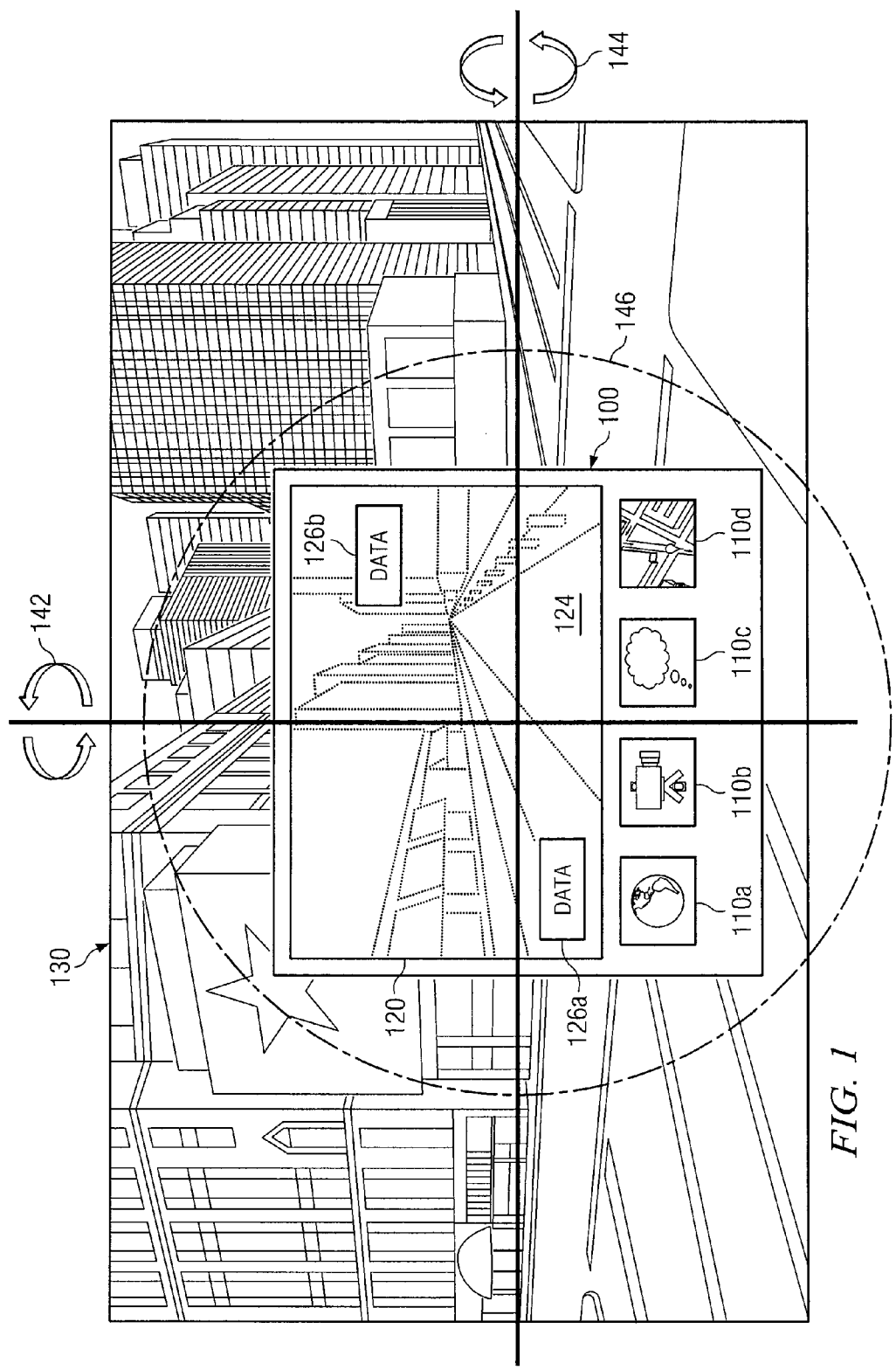
FIG. 1 illustrates an embodiment of a display that may convey situational information based on geospatial data.

It should be understood at the outset that, although example implementations of embodiments of the invention are illustrated below, the present invention may be implemented using any number of techniques, whether currently known or not. The present invention should in no way be limited to the example implementations, drawings, and techniques illustrated below. Additionally, the drawings are not necessarily drawn to scale.

Situational awareness tools may provide situational information that may aide a decision maker in making decisions. For example, in military applications, a soldier may use situational information, such as the location of a sniper, to make tactical decisions. Accordingly, the teachings of some embodiments may allow users of a situational awareness tool to share communications and observations with each other.

In some embodiments, the communications and observations about a particular location may be collected by a user, such as an agent, or a device. Examples of an agent may include a person or a vehicle. Examples of a device may include an Unmanned Aircraft Vehicle (UAV), a surveillance camera, or any device suitable for gathering information. In some embodiments, the agent may be equipped with a camera configured to collect images of the location. The data, such as the camera images, may be embedded with geographic coordinates indicating the location corresponding to the data. In some embodiments, the data may be continually updated by one or more agents or devices thereby creating a continuous journal of information about an area. The journal may be based on contributions from any agent or device that has previously reckoned the area. For example, a border patrol agent may collect and share an image of a hole in a fence. Later, a second border patrol agent may observe a change in the size of the hole. The second border patrol agent may collect and share an updated image of the hole. Thus, a user retrieving information about the fence may have access to the cumulative knowledge of both agents. Over time, a large amount of situational information may accumulate, thereby providing users with detailed information about areas of interest. In some embodiments, access to cumulative knowledge may allow the user to have increased situational awareness.

In some embodiments, a user may access the situational information from a mobile device. The mobile device may display a background image on which the situational information may be overlaid. In some embodiments, the background image may be a three-dimensional visualization image. In some embodiments, the background image may be selected according to the geospatial perspective of the device. That is, the background image may be selected according to the position and viewing angle of the device. For example, a user located in a battlefield may be interested in knowing if any Improvised Explosive Devices (IEDs) have exploded in the area in the last month. The user may point the device toward a region of the battlefield to view the location of recent IED explosions within that region. Additionally, the user may move or rotate the device to change the perspective displayed. Thus, the user may be able to obtain information about other regions within the battlefield.

FIG. 1 illustrates an embodiment of a display that may convey situational information based on geospatial data. In some embodiments the display may be generated on a device 100 which may comprise feature buttons 110 and a display screen 120. In some embodiments, the display screen 120 may comprise a background image 124 and/or one or more geotags 126. In some embodiments, the location represented by the background image 124 may correspond to the location of a live scene 130 in which the device 100 is located.

The device 100 may be any suitable device for displaying an image. In some embodiments, the device 100 may be portable. For example, the device 100 may be a mobile phone, goggles, or a laptop computer. In other embodiments, the device 100 may not be portable. The device 100 may be configured to provide a variety of features. In some embodiments, a user may access and/or control the features of the device 100 through the feature buttons 110. The feature buttons 110 may be any suitable user interface for the device 100, such as a keyboard or keypad, a mouse, or a touch screen. In some embodiments, the feature buttons 110 may be located remotely from the device 100.

The feature buttons 110 may provide access to and/or a control interface for one or more features such as, but not limited to, mapping features, tracking features, communications features, video features, global visualization features, and/or any other suitable feature. Internet features may include internet browsing as well as downloading and uploading of data. Mapping features may be configured to provide maps and travel directions to a user. Tracking features may include tracking one or more moving subjects or objects. For example, in military applications, members of allied troops may be tracked in one color and members of enemy troops may be tracked in a different color. Communications features may provide voice call, text messaging, chat session, and notification capabilities. Video features may include recording, playing, pausing, fast forwarding, and rewinding of video. Global visualization features may allow a user to select a location of the globe to be represented in a three-dimensional view. In some embodiments, an application may use capabilities of multiple feature buttons 110 at the same time. For example, a situational awareness application may use the internet feature, the communications feature, the global visualization feature, and/or any other suitable feature simultaneously. As another example, the situational awareness application may use the tracking feature, the mapping feature, and/or any other suitable feature simultaneously.

In some embodiments, one or more features may generate a display on the display screen 120. In some embodiments, the display screen 120 may be any component suitable to display an image such as a Cathode Ray Tube (CRT), a Liquid Crystal Display (LCD), a Plasma Display Panel (PDP), or a projector. In some embodiments, the display screen 120 may be a touch screen that may allow a user to control the image or the device 100. For example, the user may control the image by touching the display screen 120 to make changes such as zooming in or out, moving the image up, down, left, or right, rotating the image, or adjusting the viewing angle. As another example, the feature buttons 110 may be integrated on the display screen 120 to allow the user to control the device 100 by touching the display screen 120. In some embodiments, the display screen 120 may be configured to change the image displayed according to changes in the position and/or viewing angle of the device 100.

In some embodiments, the image displayed on the display screen 120 of the device 100 may comprise the background image 124. In some embodiments, the background image 124 may be selected according to the geographic region in which the device 100 is located in order to provide information about the live scene 130 of that geographic region. For example, the background image 124 may be selected according to the geospatial data comprising the position and the viewing angle of the device 100.

In some embodiments, the position of the device 100 may be determined using a Location Based Services (LBS) system. An LBS system may be any system suitable for locating the latitude, longitude, and/or elevation coordinates of the device 100. For example, an LBS system may use a satellite system such as a Global Positioning System (GPS) to locate the device 100. As another example, an LBS system may use multilateration techniques based on the signals sent and/or received by the device 100 such as Time Difference Of Arrival (TDOA) techniques or Enhanced Observed Time Difference (E-OTD) techniques.

In some embodiments, the viewing angle of the device 100 may be determined using any suitable systems such as, but not limited to, accelerometers, gyroscopes, and/or compasses onboard the device 100. The viewing angle may comprise azimuth data, compass direction data, and/or orientation data. Azimuth data may describe the rotation of the device 100 around a horizontal axis 142, the horizontal axis 142 running substantially parallel to the surface of the earth. For example, azimuth data may indicate whether the device 100 is pointed down toward the ground or up toward the sky. Compass direction data may describe the rotation of the device 100 around a vertical axis 144, the vertical axis 144 running substantially perpendicular to the surface of the earth. In some embodiments, the compass direction data may range from 0 to 360 degrees. For example, the compass direction may be 0 degrees when the device 100 faces East, 90 degrees when the device 100 faces North, 180 degrees when the device 100 faces West, and 270 degrees when the device 100 faces South. Orientation data may indicate whether the device 100 is turned on its side, for example, according to a device orientation angle 146. The device orientation angle 146 may represent the rotation around an axis in a third dimension, the axis in the third dimension running perpendicular to both the horizontal axis 142 and the vertical axis 144. By way of non-limiting illustration, Google's G1 mobile phone running on the Android platform and Apple's Iphone contain tools to recognize location and viewing angle of the respective mobile device.

In some embodiments, the device 100 may be configured to display the background image 124 corresponding to geospatial coordinates selected by a user of the device 100. That is, a user may override the function that selects the background image 124 corresponding to the perspective of the device 100. Overriding the device perspective may allow the user to obtain information about a position or viewing angle for which the user would like to obtain situational information. In some embodiments, the position and viewing angle of the device may be used to generate a default background image that may be the starting image when the user enables the override function. Thus, a user may continue to view information about a surrounding scene without having to continuously hold the device in the same position.

In some embodiments, the background image 124 may be displayed to provide context for situational information. In some embodiments, the characteristics of the situational information being conveyed may be used to determine the type of background image 124 to be displayed, if any. For example, a background image 124 may not be required to convey the name of a shopkeeper. As another example, a two-dimensional image, such as a map or a blueprint, may be well-suited to conveying the address where a shop is located or the floor plan of the shop. As yet another example, a three-dimensional visualization image may be well-suited to conveying the shooting angle of a sniper located at a particular entrance of the shop. In some embodiments, the three-dimensional visualization image may be provided by a three-dimensional visualization tool. In some embodiments, the three-dimensional visualization tool may be a Commercial Off-The-Shelf (COTS) tool like Google Earth or NASA World Wind.

In some embodiments, the display screen 120 of the device 100 may display one or more geotags 126 to provide situational information about the displayed image. The geotags 126 may be in any format suitable to convey the situational information. For example, the geotags 126 may be in visual form, such as text, icons, photographs, color codes, and/or drawings, audio form, such as voice recordings or sound effects, or a combination, such as video. In some embodiments, the geotags 126 may comprise geographic coordinates that indicate a location corresponding to the geotag. In some embodiments, the geographic coordinates may indicate the latitude, longitude, and/or elevation described by the situational information. For example, if the situational information indicates that an IED exploded, the geographic coordinates may indicate where the IED exploded. The geotags 126 may be overlaid on the background image 124. For example, the geotags may be overlaid according to their geographic coordinates. Geotags may be generated using any suitable method, device, or technique that places coordinates on a piece of information. The coordinates may be two-dimensional, three-dimensional, or four-dimensional (including time). As a non-limiting example, geotags may be generated using the method of U.S. Ser. No. 12/501,969 to generate geotags.

In some embodiments, the geotags 126 may comprise social network geotags, historical geotags, identification geotags, annotation geotags, or a combination. For example, social network geotags may indicate social opinion information like where to find the best coffee in town, social relationship information like a shop owner's brother is a military detainee, social observation information like a sniper has been observed in a particular location, or any other information available through a social network.

Historical geotags may provide historical information such as the number of Improvised Explosive Devices (IEDs) that detonated in the area in the last month.

Identification geotags may provide identification information. For example, an identification geotag may identify an orphanage one hundred yards away. As another example, an identification geotag may translate Grid Reference Graphics (GRG) information. GRG information may provide a naming convention for describing a location. The GRG information may comprise a name that denotes a particular building, a color that denotes a floor number of the building, and a number that denotes an entrance of the building. For example, a soldier may receive GRG information "Matilda, green, 2" indicating the location of a sniper. However, understanding this GRG information may require knowledge of the naming convention. In some embodiments, the geotags 126 may provide the information of the GRG reference without requiring the user to know the GRG naming convention. Thus, the soldier may be able to visualize where the sniper is located and/or the sniper's shooting angle when deciding how to safely approach the building.

Annotation geotags may comprise notes that a user makes about a scene. For example, a user may annotate the background image 124 using a grease pen function that allows the user to draw or write on the display screen 120 by hand or a computerized annotation function that allows a user to select descriptive icons, labels, or color codes to be incorporated into the underlying scene at the option of the user.

In some embodiments, the geotags 126 may be given a rating. For example, determining where to find the best coffee in town may be based on the highest percentage of favorable ratings according to a large number of users. As another example, ratings may be affected by the date and time the geotag 126 was generated. For example, more current geotags may be given a more favorable rating than older geotags. In some embodiments, a rating system may help to ensure a user is provided access to more informative geotags. For example, if a first geotag is a photograph with a clear view and a second geotag is a blurry photograph of the same view, the first geotag may be given a more favorable rating.

A component described in FIG. 1 may include an interface, logic, memory, and/or other suitable element used to carry out the above-described functions. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor, may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to systems described herein without departing from the scope of the invention. The components of the systems may be integrated or separated. Moreover, the operations of the systems may be performed by more, fewer, or other components. Additionally, operations of the systems may be performed using any suitable logic comprising software, hardware, and/or other logic. As used in this document, "each" refers to each member of a set or each member of a subset of a set.

Figure 2:
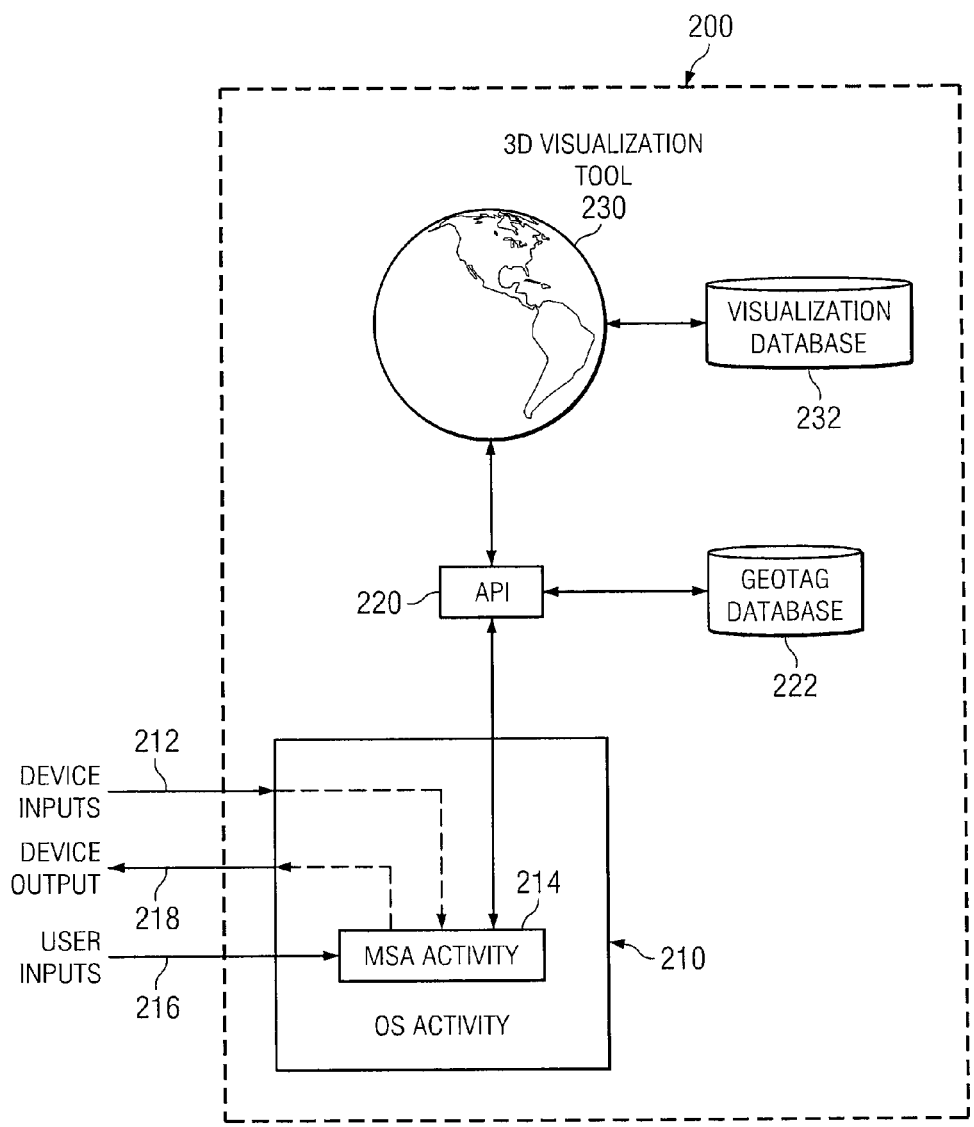
FIG. 2 is a block diagram illustrating a system for displaying situational information based on geospatial data

FIG. 2 is a block diagram illustrating a system for displaying situational information based on geospatial data. For example, a requestor, such as a logical component of a device like the device 100 of FIG. 1 or a user of that device, may send a request to a situational awareness tool. The request may seek a geotag comprising situational information and geographic coordinates. In some embodiments, the request may be active. For example, a user may submit a request for a geotag comprising certain characteristics, such as a social network geotag for the best coffee shop on the block. In some embodiments, the request may be passive, such as when the device is configured to accept geotags that may be pushed to it from another device. For example, a passive request may be sent at the time the device powers up, at the time a user logs on to the device, or at the time when a user toggles a switch that allows the device to passively receive geotags. In some embodiments, the geotags may be sent to the requestor in real-time as the situational information is observed, or the geotags may be sent later in time. In some embodiments, a geotag may be selected to be sent to the user if its geographic coordinates are near the requestor as determined by the geospatial data identifying the location of the requestor. A geotag may be considered near the requestor if the situational information described by the geotag may be relevant to the user. The distance associated with relevancy of the geotag may vary depending on its type. For example, the best coffee shop on the block may be considered near the requestor if it is within 500 yards of the requestor, whereas the location of a hole in a border fence may be considered near the requester if it is within 100 miles of the requester. Some types of information may be relevant regardless of the amount of distance from the requestor.

In some embodiments, the situational information may be stored locally, obtained from a network, or a combination of both. Examples of a network may include, but are not limited to, a public or private data network; a local area network (LAN); a metropolitan area network (MAN); a wide area network (WAN); a wireline or wireless network; a local, regional, or global communication network; an optical network; a satellite network; an enterprise intranet; other suitable communication links; or any combination of the preceding. In some embodiments, the network may comprise a client-server network with one or more central databases for storing, sorting, and pulling geotags. In some embodiments, the network may comprise a peer-to-peer network. A peer-to-peer network may comprise a plurality of peers, each peer capable of acting as both a client and a server. Thus, the situational awareness tool may not require a central database in some embodiments. In some embodiments, the network may comprise a combination of client-server and peer-to-peer networks. For example, a client-server configuration may be used for normal operations, and a peer-to-peer network may be formed ad hoc as needed, such as when a signal tower goes down, when two or more users are out of range of the signal tower, or when a peer-to-peer configuration would otherwise be efficient.

In some embodiments, access to some or all of the geotags may be restricted to certain users. Determining whether a user is authorized to access the geotag may be based on predetermined criteria such as, but not limited to, user name, password, device serial number, and/or any suitable criteria.

In some embodiments, the system of FIG. 2 may comprise a device 200, which may be like the device 100 of FIG. 1. The device 200 may be configured with a mobile situational awareness tool. In some embodiments, the device 200 may comprise an Operating System (OS) Activity 210, an Application Programming Interface (API) 220, and/or a three-dimensional visualization tool 230. In some embodiments, the device 200 may receive inputs such as device inputs 212 and/or user inputs 216 to generate a device output 218. In some embodiments, the OS Activity 220 may comprise a Mobile Situational Awareness (MSA) 214. In some embodiments, the API 220 may be coupled to a geotag database 222. In some embodiments, the three-dimensional visualization tool 230 may be coupled to a visualization database 232.

In some embodiments, the OS Activity 210 may be an interface between the hardware and the software of the device 200. For example, OS Activity 210 may comprise base classes that interact with the hardware architecture of the device 200. In some embodiments, the OS Activity 210 may manage a situational awareness application. For example, the OS Activity 210 may receive the device inputs 212 and direct them to the situational awareness application. In some embodiments, the device inputs 212 may comprise geospatial data defining a geographic region in which the device 200 is located. For example, the geospatial data may comprise position data, such as latitude data, longitude data, and elevation data, and/or viewing angle data, such as azimuth data, compass direction data, and orientation data. In some embodiments, the device inputs 212 may comprise situational information to be pushed from the device to a the situational awareness tool. For example, the device inputs 212 may comprise a new geotag, such as a photograph, to be pushed to the geotag database 222.

In some embodiments, the MSA Activity 214 of the OS Activity 210 may extend the base capabilities of the OS Activity 210. In some embodiments, the MSA Activity 214 may receive user inputs 216 from a user interface. For example, the user inputs 216 may comprise user search criteria and/or user viewing criteria. In some embodiments, user search criteria may indicate the characteristics of the geotags that the user is interested in retrieving. For example, the user search criteria may indicate that the user has requested to see the names of store clerks on the block. As another example, the user search criteria may indicate that the user has requested to see the location of a hole in a fence. The user search criteria may be used to request any suitable characteristics. In some embodiments, user viewing criteria may indicate the view that the user is interested in seeing. For example, the user may request to modify the viewing angle of the current view. As another example, the user may request to view the geographic region corresponding to a particular set of geographic coordinates.

In some embodiments, the MSA Activity 214 may send the device inputs 212 and/or the user inputs 216 to the API 220. The API 220 may process the inputs. In some embodiments, the API 220 may process a new geotag being pushed by a user so that the geotag may be stored in the geotag database 222. In some embodiments, the API 220 may process a request for data. For example, the API may process the user search criteria of the user inputs 216 to pull a geotag from the geotag database 222. As another example, the API 220 may process geospatial data received from the device inputs 212 or from the user viewing criteria of the user inputs 216 to pull a three-dimensional visualization image from the three-dimensional visualization tool 230. In some embodiments, the API 220 may format the geotags in a file format that may be used by the three-dimensional visualization tool 230. For example, the geotag translator 240 may format the geotags in Keyhole Markup Language (KML) format or Key Length Value (KLV) format.

In some embodiments, the API 220 may be coupled to the geotag database 222. The geotag database 222 may be local, for example, it may be located on the device configured with the API 220. Alternatively, the geotag database 222 may be remote, for example, it may be located at a network server. The geotag database 222 may receive, store, sort, and/or send a plurality of geotags. In some embodiments, the mobile situational awareness tool may receive a request to pull a geotag from the geotag database 220. The geotags stored in the geotag database 222 may be candidates for responding to the request. The geotag database 222 may store hundreds, thousands, or more candidate geotags. If a candidate geotag fits the criteria of the request, the candidate geotag may be sent to the requester. For example, the request may comprise geospatial data that defines a geographic region in which the device 200 is located. The geospatial data may be based on the device inputs 212 and/or the user inputs 216. In some embodiments, the geotag database 222 may send a candidate geotag in response to the request if the geographical coordinates of the candidate geotag are within the geographic region of the request. In some embodiments, the request may comprise user search criteria indicating one or more characteristics of the geotag requested from the database. The geotag database 222 may send a candidate geotag if the characteristics of the candidate geotag match the characteristics requested in the request.

In some embodiments, the three-dimensional visualization tool 230 may be used to generate a background image, such as the background image 124 of FIG. 1. The background image may be selected according to geospatial data such as latitude, longitude, elevation azimuth, compass direction, and/or orientation. In some embodiments, the geospatial data may be based on the device inputs 212, the user viewing criteria of the user inputs 216, or a combination. For example, a background image selected according to the device inputs 212 may be refined according to the user viewing criteria. In some embodiments, the user viewing criteria may allow the user to modify the perspective of the view by accessing features of a COTS three-dimensional visualization tool such as Google Earth or NASA World Wind. For example, the user may be able to zoom in or zoom out of the area surrounding the location shown in the video, shift the image up, down, left, or right, change the compass direction, or change the viewing angle. Refining the background area according to the user viewing criteria may provide the user with more information which may allow for greater situational awareness.

According to some embodiments, the user viewing criteria may also comprise any criteria that may be entered into the three-dimensional visualization tool 230. That is, the user viewing criteria may be used to access any feature of the three-dimensional visualization tool 230 such as a COTS three-dimensional viewing tool. For example, the user viewing criteria may request that information be displayed such as geographic borders, names of geographic locations, names of landmarks, or street locations and names. The user viewing criteria may also modify the displayed image to provide more information about the view. For example, buildings may be displayed in a three-dimensional form, photographs of street views may be accessed, or terrain information may be shown. The user viewing criteria may also be used to view current conditions in the area such as traffic and/or weather conditions.

In some embodiments, the three-dimensional visualization tool 230 may be coupled to a database, such as a visualization database 232. The visualization database 232 may be local, for example, it may be located on the device configured with the three-dimensional visualization tool 230. Alternatively, the visualization database 232 may be remote, for example, it may be located at a network server. According to some embodiments, the visualization database 232 may be a COTS database. The visualization database 232 may hold three-dimensional visualization images depicting a plurality of locations. In some embodiments, the images may comprise satellite images, aerial photography images, Geographic Information System (GIS) images, or a combination. The three-dimensional visualization tool 230 may query the visualization database 234 to obtain images of a particular location.

In some embodiments, the API 220 may return the requested data, such as a geotag or a background image comprising a three-dimensional visualization image, to the OS Activity 210 via the MSA Activity 214. The OS Activity 210 may output the data at the device output 218. In some embodiments, the device output 218 may be used to convey the information to a user. For example, the device output 218 may be used to display the information at a display. In some embodiments, the device output 218 may be input into another system. For example, the device output 210 may be output to a computer where the data may be further processed or displayed.

Modifications, additions, or omissions may be made to the methods described herein without departing from the scope of the invention. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke 6 of 35 U.S.C. §112 as it exists on the date of filing hereof unless the words "means for" or "step for" are explicitly used in the particular claim.

What is claimed is:

1. A method comprising:
receiving, by a geotag database comprising a plurality of predetermined geotags, a geotag request from a device associated with a requestor, wherein the plurality of predetermined geotags comprise respective situational information and geographic coordinates, the request comprising geospatial data that identifies a location and a physical orientation of the device associated with the requestor, the geospatial data comprising:
position data comprising one or more of latitude data, longitude data and elevation data; and
viewing angle data identifying the physical orientation of the device associated with the requestor, the viewing angle data comprising one or more of azimuth data, compass direction data, and orientation data;
comparing the geographic coordinates of each of the plurality of predetermined geotags to the geospatial data received in the request to determine a subset of the plurality of predetermined geotags that are near the location and within a viewing area defined by the physical orientation of the device, wherein the subset of the plurality of predetermined geotags comprises two or more geotags; and
sending the determined subset of the plurality of predetermined geotags to the device associated with the requestor in response to the geotag request.

2. The method of claim 1, further comprising:
overlaying the determined subset of the plurality of predetermined geotags on a background image comprising the location of the requestor, the determined subset of the plurality of predetermined geotags overlaid according to their respective geographic coordinates; and displaying the background image and the determined subset of the plurality of predetermined geotags on a display of the device.

3. The method of claim 2, wherein the background image is generated by a three-dimensional visualization tool.

4. The method of claim 1, wherein the determined subset of the plurality of predetermined geotags are selected from the group of geotags consisting of social network geotags, historical geotags, identification geotags, and annotation geotags.

5. The method of claim 1, the determined subset of the plurality of predetermined geotags further comprising a respective ratings, indicating the usefulness of the respective geotags according to one or more users.

6. The method of claim 1, wherein the location of the requestor is overridden with a user viewing criterion that indicates a location of interest to the requestor.

7. The method of claim 1, wherein the request further comprises user search criteria, the user search criteria indicating a characteristic of the situational information of the subset of the plurality of predetermined geotags being requested in the geotag request, wherein the situational information is distinct from the geospatial data in the plurality of predetermined geotags.

8. The method of claim 1, further comprising:
verifying that the requestor is authorized to receive the candidate geotag, and sending the candidate geotag to the requestor only if the requestor is authorized.

9. The method of claim 1, wherein sending the candidate geotag to the requestor further comprises sending the candidate geotag from a peer of a peer-to-peer network.

10. An apparatus comprising:
a processor; and
a non-transitory computer readable media comprising logic, the logic, when executed by the processor, being configured to:
receive, by a geotag database comprising a plurality of predetermined geotags, a geotag request from a device associated with a requestor, wherein the plurality of predetermined geotags comprise respective situational information and geographic coordinates, the request comprising geospatial data that identifies a location and a physical orientation of the device associated with the requestor, the geospatial data comprising:
position data comprising one or more of latitude data, longitude data and elevation data; and
viewing angle data identifying the physical orientation of the device associated with the requestor, the viewing angle data comprising one or more of azimuth data, compass direction data, and orientation data;
compare the geographic coordinates of each of the plurality of predetermined geotags to the geospatial data received in the request to determine a subset of the plurality of predetermined geotags that are near the location and within a viewing area defined by the physical orientation of the device, wherein the subset of the plurality of predetermined geotags comprises two or more geotags; and
send the determined subset of the plurality of predetermined geotags to the device associated with the requestor in response to the geotag request.

11. The apparatus of claim 10, the logic, when executed, being further configured to:
overlay the determined subset of the plurality of predetermined geotags on a background image comprising the location of the requestor, the determined subset of the plurality of predetermined geotags overlaid according to their respective geographic coordinates; and displaying the background image and the determined subset of the plurality of predetermined geotags on a display of the device.

12. The apparatus of claim 11, wherein the background image is generated by a three-dimensional visualization tool.

13. The apparatus of claim 10, wherein the location of the requestor is overridden with a user viewing criterion that indicates a location of interest to the requestor.

14. The apparatus of claim 10, the logic, when executed, being further configured to:
verify that the requestor is authorized to receive the candidate geotag, and send the candidate geotag to the requestor only if the requestor is authorized.

15. A device configured to:
send, to a geotag database comprising a plurality of predetermined geotags, a geotag request from a requestor, wherein the plurality of predetermined geotags comprise respective situational information and geographic coordinates, the request comprising geospatial data that identifies a location and a physical orientation of the device, the geospatial data comprising:
position data comprising one or more of latitude data, longitude data, and elevation data; and
viewing angle data identifying the physical orientation of the device associated with the requestor, the viewing angle data comprising one or more of azimuth data, compass direction data, and orientation data; and
receive in response to the geotag request a determined subset of the plurality of predetermined geotags returned in response to the request is wherein the determined subset of the plurality of predetermined geotags are each near the location and within a viewing area defined by the physical orientation of the device, wherein the subset of the plurality of predetermined geotags comprises two or more geotags.

16. The device of claim 15, further configured to:
overlay the determined subset of the plurality of predetermined geotags on a background image comprising the location of the requestor, the determined subset of the plurality of predetermined geotags overlaid according to its their respective geographic coordinates; and displaying the background image and the determined subset of the plurality of predetermined geotags on a display of the device.

17. The device of claim 16, wherein the background image is generated by a three-dimensional visualization tool.

18. The device of claim 15, further configured to override the location of the requestor with a user viewing criterion that indicates a location of interest to the requestor.

19. The device of claim 15, wherein the request further comprises user search criteria, the user search criteria indicating a characteristic of the situational information of the subset of the plurality of predetermined geotags to be sent, wherein the situational information is distinct from the geospatial data in the plurality of predetermined geotags.

* * * * *

UNITED STATES PATENT AND TRADEMARK OFFICE
CERTIFICATE OF CORRECTION

| | | |
|---|---|---|
| PATENT NO. | : 8,558,847 B2 | Page 1 of 1 |
| APPLICATION NO. | : 12/501766 | |
| DATED | : October 15, 2013 | |
| INVENTOR(S) | : Nicholas W. Knize et al. | |

It is certified that error appears in the above-identified patent and that said Letters Patent is hereby corrected as shown below:

Title page, item (75), Inventors: On the second inventor, Larry L. Johnson, delete the "L." and insert --J.-- as the middle initial. Inventors should read as follows:

Inventors: Nicholas W. Knize, Rockwall, TX (US);
Larry J. Johnson, Sachse, TX (US);
Roberto Reta, Richardson, TX (US)

Signed and Sealed this
Eleventh Day of March, 2014

Michelle K. Lee
*Deputy Director of the United States Patent and Trademark Office*